(12) United States Patent
Kelly et al.

(10) Patent No.: US 6,901,648 B2
(45) Date of Patent: Jun. 7, 2005

(54) METHOD OF MANUFACTURING A NICKEL-BASE ALLOY WELDING FILLER METAL

(75) Inventors: Thomas Joseph Kelly, Cincinnati, OH (US); Michael James Weimer, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/944,708

(22) Filed: Aug. 31, 2001

(65) Prior Publication Data

US 2003/0041436 A1 Mar. 6, 2003

(51) Int. Cl.$^7$ ............................. B21B 1/46; B21D 39/00
(52) U.S. Cl. ......................... 29/527.5; 29/423; 29/505; 29/514
(58) Field of Search .................. 29/527.5, 527.7, 29/423, 825; 228/262.3

(56) References Cited

U.S. PATENT DOCUMENTS

| | | | |
|---|---|---|---|
| 4,209,122 A | | 6/1980 | Hunt |
| 4,323,186 A | * | 4/1982 | Hunt ............................. 29/423 |
| 4,337,886 A | * | 7/1982 | King et al. ............... 228/262.3 |
| 4,624,706 A | | 11/1986 | Badia |
| 5,794,338 A | | 8/1998 | Bowden, Jr. et al. |
| 5,898,994 A | | 5/1999 | Miller et al. |
| 6,539,620 B1 | * | 4/2003 | Smashey ...................... 29/825 |

* cited by examiner

*Primary Examiner*—Marc Jimenez
(74) *Attorney, Agent, or Firm*—McNees Wallace & Nurick LLC

(57) ABSTRACT

A welding filler metal is manufactured by casting a nickel-base alloy as an extrusion rod having a diameter of from about 0.2 inch to about 0.5 inch. The extrusion rod has at least about 12 grains in the cross section of the extrusion rod. The extrusion rod is extruded in a single extrusion operation to a filler-metal diameter of less than about 0.1 inch and using an areal extrusion ratio of at least about 9:1 to form the welding filler metal. Preferably, the process is used to make a nickel-base superalloy welding filler metal of a diameter of about 0.05–0.06 inch from an extrusion-rod casting of about ¼ inch diameter and having at least about 12 grains in the cross section.

13 Claims, 3 Drawing Sheets

METHOD OF MANUFACTURING A NICKEL-BASE ALLOY WELDING FILLER METAL

This invention relates to the manufacture of welding filler metal made of a nickel-base alloy and used in welding procedures and, in particular, to an economical manufacturing process.

BACKGROUND OF THE INVENTION

In one type of welding, two or more pieces of metal are heated to their melting points and fused together. Optionally, additional molten metal may be added from a welding filler metal (also sometimes termed "weld rod" or "weld wire" in the art). In another type of welding, the filler metal is melted and applied to a face of a substrate to build up the substrate. This second type of welding is used to repair substrates that have become thinned or damaged during service, or to apply a special facing to the substrate such as a hard facing or an environmentally resistant buildup. In either type of welding, the welding filler metal is melted and fed into the melted region. "Welding filler metal" may be of discrete lengths, which are typically used in manual welding operations, or it may be of continuous lengths used in automated welding machines.

A wide variety of methods are used to manufacture welding filler metal, with drawing or rolling being favored for ductile metals such as steels. The methods that may be used to manufacture welding filler metal of nickel-base superalloys are limited by the inability of most superalloys to be drawn, rolled, or swaged. Powder techniques are also of limited use, as they are expensive and may lead to a final product of insufficient ductility to be useful.

Instead, in conventional commercial practice the nickel-base superalloy to be made into a welding filler metal is cast into a rod about 1 inch in diameter. A number of these rods are sealed into an extrusion can and thereafter extruded to about ¼-inch diameter. The ¼-inch diameter rods are de-canned, cut to length, sealed into another extrusion can, and extruded a second time to about 0.06 inch diameter. This approach is acceptable technically, but it leads to a high cost of the superalloy welding filler metal. About 30 percent or more of the length of each extrusion is lost due to front-end and tail-end extrusion loss, so that the yield of usable welding filler metal from the double-extrusion process is typically less than 50 percent, and often about 25 percent or less, of the weight of the starting material. As a result, the cost of superalloy welding filler metal is sometimes as much as $700 per pound.

There is a need for an improved approach to the manufacture of an acceptable quality, economically produced welding filler metal of nickel-base alloys such as nickel-base superalloys. The present invention fulfills this need, and further provides related advantages.

BRIEF SUMMARY OF THE INVENTION

The present invention provides a manufacturing method for preparing welding filler metal made of nickel-base alloys, and particularly nickel-base superalloys. The approach substantially reduces the cost per pound of the manufactured welding filler metal, without any reduction in quality.

A method of manufacturing a welding filler metal comprises the steps of casting a nickel-base alloy as an extrusion rod having a diameter of from about 0.2 inch to about 0.5 inch. The extrusion rod has at least about 12 grains in the cross section of the extrusion rod. The extrusion rod is extruded in a single (that is, exactly one) extrusion operation to a filler-metal diameter of less than about 0.1 inch and using an areal extrusion ratio of at least about 9:1 to form the welding filler metal. In a preferred approach, the nickel base alloy is cast to an extrusion-rod diameter of about ¼ inch, and then extruded to a filler-metal diameter of from about 0.05 to about 0.06 inch. Stated alternatively, in this embodiment a nickel-base alloy is first cast as an extrusion rod of about ¼ inch diameter, so that the extrusion rod has at least about 12 grains in the ¼ inch diameter cross section of the extrusion rod. The extrusion rod is then extruded in a single extrusion operation to a filler-metal diameter of from about 0.05 to about 0.06 inch.

Although the present approach works with a wide variety of nickel-base alloys, its greatest benefits are achieved when the nickel-base alloy is a nickel-base superalloy. Examples of nickel-base superalloys operable with the present invention include Rene' 142, Rene' 195, Rene' N5, Rene' N6, PWA 1480, and PWA 1484.

An important aspect of the invention is the ability to achieve the required number of grains (at least about 12 grains in the cross section) in the casting of the extrusion rod. This structure is preferably achieved by casting with a casting superheat of no more than about 50° F., and investment casting the nickel-base alloy into a mold having a grain refiner adherent to an inner surface of a wall of the mold.

If the cast extrusion rod has fewer grains than specified, it is likely that during the single extrusion operation at least some location along the length of the extrusion rod will have a grain whose crystallographic orientation is unfavorable for extrusion. That is, there will be a "bulge" at the location of the unfavorably oriented grain, so that the extruded rod is not uniformly reduced at that location but remains somewhat enlarged while regions on either side along the length of the rod are fully reduced. Because usually a large number (typically about 200) of the extrusion rods are bundled together and extruded at once, some of the neighboring extrusion rods will be of reduced cross-sectional area to accommodate the bulge. Consequently, a large number of the extruded welding filler metal rods will have a defect that must be cut out, shortening the effective length of each good section of welding filler metal, increasing the number of joints that are required along the length of the welding filler metal, and increasing the per-pound cost of the final product. The present approach, by starting with a relatively large number of grains in the cast extrusion rod, reduces the chances of such an occurrence. The present approach thus produces welding filler metal of significantly reduced cost, because the yield of final product as a fraction of the starting weight of material is increased.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
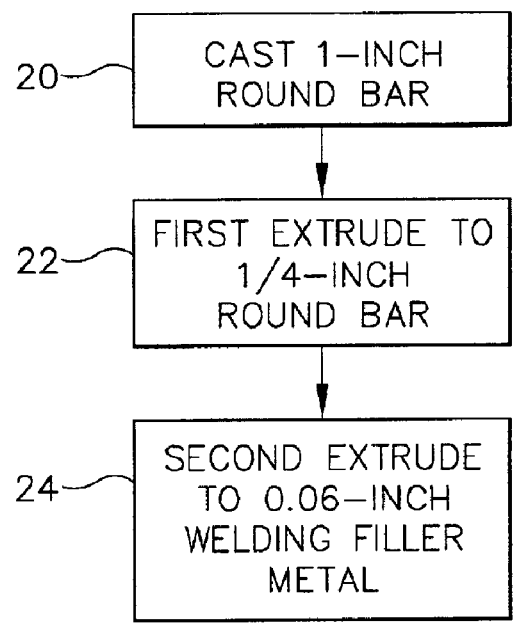
FIG. 1 is a block diagram of a prior approach for preparing welding filler metal of nickel-base superalloys.

FIG. 1 depicts a prior approach for preparing welding filler metal of a nickel-base superalloy in a standard size of about 0.05 to about 0.06 inch diameter. A one-inch round bar of the nickel-base superalloy is cast, numeral 20. This bar is extruded to about ¼ inch diameter in a first extrusion operation, numeral 22. In performing this first extrusion, a number of the one-inch diameter bars are bundled together inside a steel extrusion can which is welded shut. The extrusion can and the contained bars are extruded with an areal extrusion ratio of about 16:1. After extrusion, the can is removed from the resulting ¼ inch diameter rods. The rods are cleaned, and a number of the ¼-inch diameter rods are repackaged in another steel extrusion can and second extruded, numeral 24, with an extrusion ratio such that the rods are about 0.05–0.06 inch in diameter after subsequent removal from the extrusion can. Each extrusion process has a scrap loss of unusable material at the front end and the tail end of the extrusion totaling at least 30 percent of the weight of the material introduced into the respective extrusion process. In commercial practice the net process yield is typically at most 25–50 percent of the total weight that is first cast in step 20, and may be even lower. Superalloys have a high material cost, and this low yield of good welding filler metal results in a net cost of as much as $700 per pound of usable welding filler metal.

Figure 2:
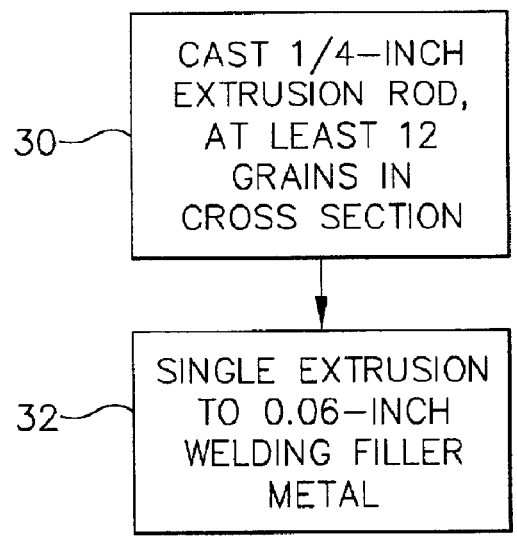
FIG. 2 is a block diagram of the present approach for preparing welding filler metal of nickel-base superalloys.

By contrast, FIG. 2 illustrates the present approach. A nickel-base alloy, preferably a nickel-base superalloy, is provided and cast into an extrusion rod, numeral 30. For the present illustration of the invention, the preferred dimensions of a ¼ inch diameter extrusion rod and a 0.06 inch diameter welding filler metal are used, but the invention is not so limited. ("Welding filler metal" is also sometimes termed "weld rod" or "weld wire" in the art.) As used herein, "nickel-base" means that the composition of the alloy has more nickel present than any other element. The nickel-base superalloys are typically of a composition that is strengthened by the precipitation of gamma-prime phase or a related phase. The nickel-base superalloy alloy typically has a composition, in weight percent, of from about 4 to about 20 percent cobalt, from about 1 to about 10 percent chromium, from about 4 to about 7 percent aluminum, from 0 to about 2 percent molybdenum, from about 3 to about 8 percent tungsten, from about 4 to about 12 percent tantalum, from 0 to about 3 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

Some examples of specific nickel-base compositions with which the present invention may be used include Rene' 195, which has a composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities; Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities; Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; and PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities. The present approach is not limited to these nickel-base superalloys, which are presented only as examples of operable compositions which are desirably made into welding filler metal.

Figure 3:
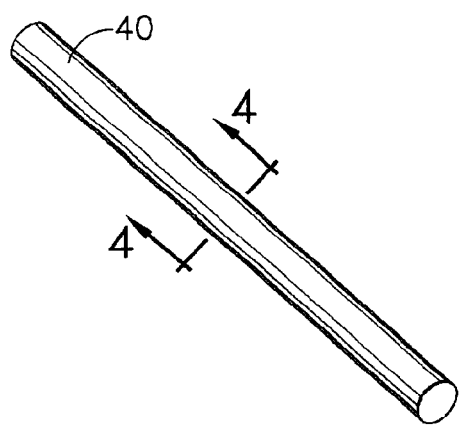
FIG. 3 is a perspective view of an extrusion rod prepared by the approach of FIG. 2.
Figure 4:
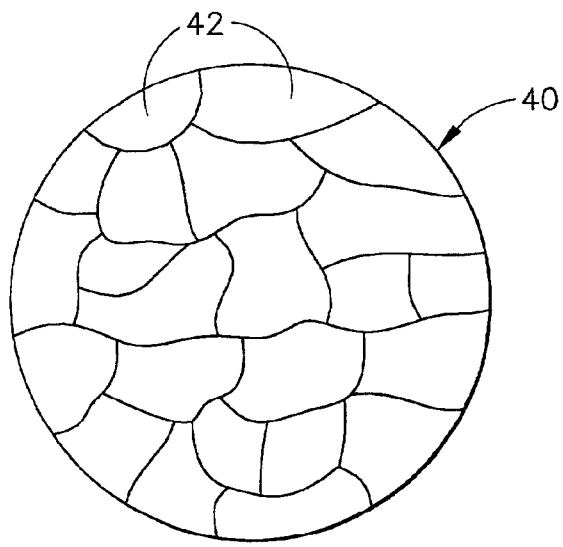
FIG. 4 is an enlarged cross-sectional view of the extrusion rod of FIG. 3, taken on line 4—4.

The nickel-base superalloy is most preferably cast into a ¼ inch-diameter extrusion rod 40, shown in FIG. 3, but the as-cast extrusion rod may have a diameter ranging from about 0.2 to about 0.5 inch, and more preferably from about 0.2 to about 0.3 inch. If the diameter of the extrusion rod 40 is less than about 0.2 inch, there will be insufficient reduction in area upon extrusion to achieve the desired properties. If the diameter of the extrusion rod 40 is more than about 0.5 inch, and typically more than about 0.3 inch, it cannot be extruded economically in available extrusion presses. The ¼-inch diameter extrusion rod must have at least about 12 grains 42 when viewed in its cross section, as illustrated in FIG. 4. ("At least about" means "equal to or exceeding about".) FIG. 4 is an idealization, in that the extrusion rod 40 may not be perfectly round. If it is not perfectly round, there must still be at least about 12 grains in the cross-sectional area of an equivalent ¼-inch diameter round rod.

In preliminary studies leading to the present invention, it was found that, if there are fewer than about 12 grains in the cross section of the extrusion rod 40, there is a likelihood that a single grain of unfavorable extrusion orientation will dominate at least some regions along the length of the extrusion rod during the single extrusion operation. The result is an extrusion defect in the form of a bulge in the rod at the location of the unfavorable grain orientation. Because a large number of the extrusion rods are packed together in the extrusion can, a corresponding defect in the form of a reduced section will be found in the neighboring extruded welding filler metal. The welding operations are much more easily conducted when the welding filler metal is of uniform diameter, and such defects can interfere with the welding operations. The defective lengths of welding filler metal may be cut out and the non-defective lengths butt welded in an end-to-end fashion, but that repair is costly. Thus, the present approach requires that there be at least about 12 grains in the ¼-inch diameter as-cast extrusion rod 40 so as to avoid such defects.

To obtain at least about 12 grains in the cross section of the ¼ inch round rod, it is preferred to include two specific features in the casting step 30. First, the nickel-base alloy is cast with a low superheat of no more than about 50° F. The "superheat" is the difference between the molten metal pouring temperature and the liquidus temperature of the alloy. The liquidus temperature is the temperature at which, upon cooling the alloy from the molten state, the formation of solid metal is first thermodynamically favored. The liquidus temperature for most alloys is available from its equilibrium phase diagram. If the superheat is greater than about 50° F., there is a tendency to form a small number of large grains, rather than a large number of small grains.

Figure 5:
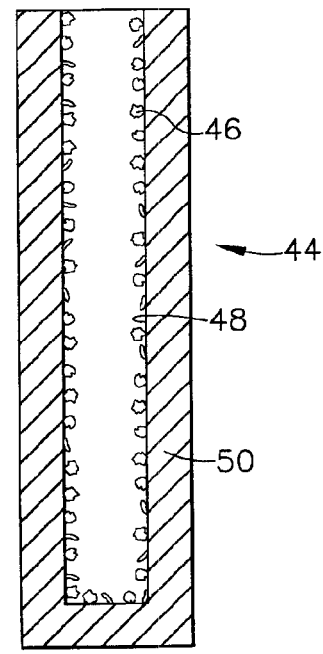
FIG. 5 is a schematic view of a casting mold for preparing extrusion rod.

The second feature is that the casting mold 44, shown in FIG. 5, is provided with a grain refiner 46 on the inner surface 48 of the mold wall 50. In FIG. 5, the grain refiner 46 is schematically indicated as a series of small dots, and in practice the grain refiner 46 is typically a plurality of small particles such as cobalt oxide adhered to the inner surface 48 of the mold wall 50. These small particles of grain refiner 46 provide a large number of nucleation sites at which grains may nucleate. The combination of the low superheat and the presence of the grain refiner aid in achieving the objective of at least about 12 grains in the ¼-inch diameter cross section of the as-cast extrusion rod 40. The grain refiner normally remains on the external surface of the rods and is removed with the ceramic shell during post-casting cleanup.

Figure 6:
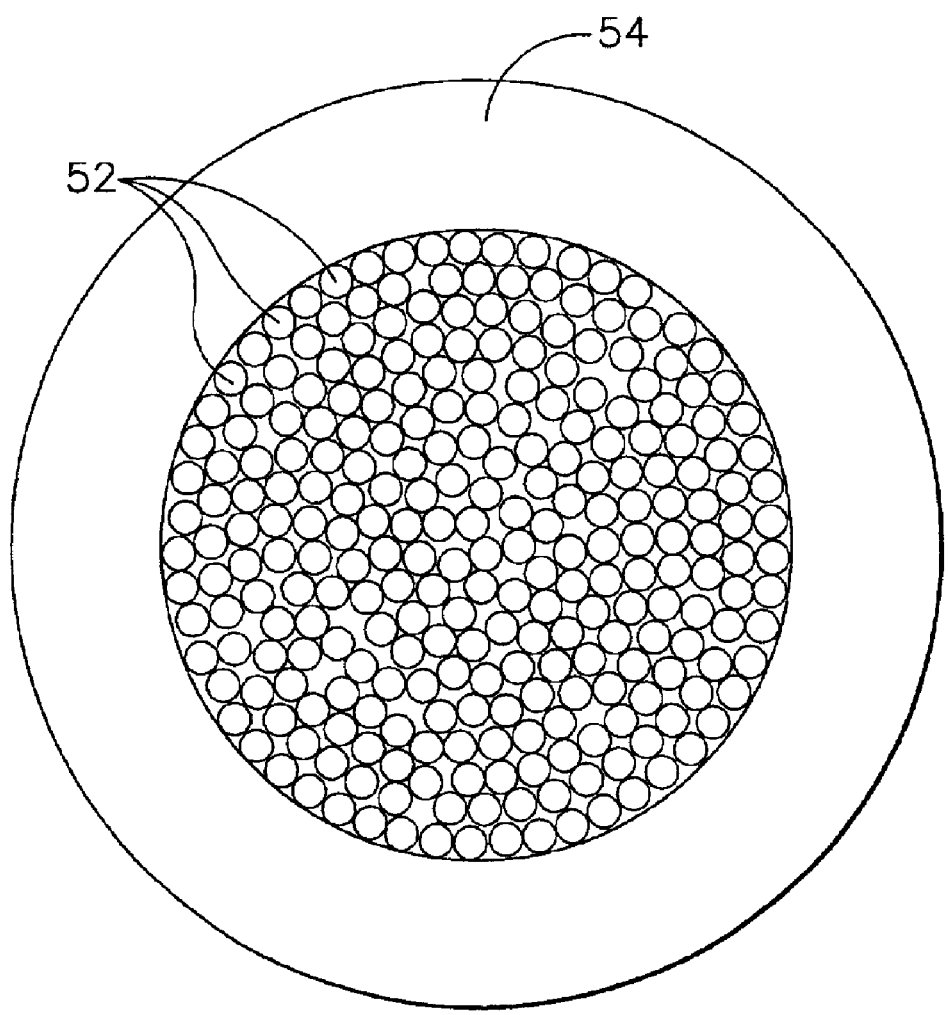
FIG. 6 is a schematic cross-sectional view of an extrusion assembly of the extrusion rods of FIG. 3, but after the single extrusion has been completed.

The extrusion rod 40 is extruded, in a single extrusion operation, to a diameter of less than about 0.1 inch and with an areal extrusion ratio of at least about 9:1, and preferably from about 9:1 to about 25:1, numeral 32 of FIG. 2. (The areal extrusion ratio is the ratio of the cross-sectional area of the rods prior to extrusion to the cross-sectional area of the rods after extrusion. Again, the rods may not be perfectly round in cross section, but that is acceptable.) If the areal extrusion ratio is less than about 9:1, the desired final structure of the welding filler metal is not obtained. In the preferred case, the ¼-inch diameter extrusion rod 40 is extruded to about 0.05 to about 0.06 inch diameter welding filler metal 52, illustrated in FIG. 6. To accomplish this single extrusion, a number of the extrusion rods 40 (typically about 200) are packed into an extrusion can 54, typically made of steel. The extrusion can is welded shut, heated to an extrusion temperature which for nickel-base superalloys is about 2200° F., and extruded using a large extrusion press with the desired extrusion ratio.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of manufacturing a welding filler metal, comprising the steps of
    casting a nickel-base alloy as an extrusion rod having a diameter of from about 0.2 inch to about 0.5 inch, the extrusion rod having at least about 12 grains in the cross section of the extrusion rod; and
    extruding the extrusion rod in a single extrusion operation to a filler-metal diameter of less than about 0.1 inch and using an areal extrusion ratio of at least about 9:1 to form the welding filler metal.

2. The method of claim 1, wherein the step of casting the nickel-base alloy includes the step of
    casting a nickel-base superalloy.

3. The method of claim 1, wherein the step of casting includes the step of
    casting a nickel-base alloy having a composition selected from the group consisting of Rene' 195, which has a nominal composition in weight percent of about 7.4–7.8 percent chromium, about 5.3–5.6 percent tantalum, about 2.9–3.3 percent cobalt, about 7.6–8.0 percent aluminum, about 0.12–0.18 percent hafnium, about 0.5–0.6 percent silicon, about 3.7–4.0 percent tungsten, about 1.5–1.8 percent rhenium, about 0.01–0.03 percent carbon, about 0.01–0.02 percent boron, remainder nickel and incidental impurities; Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities; Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; and PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities.

4. The method of claim 1, wherein the step of casting includes
    casting the nickel base alloy to an extrusion-rod diameter of about ¼ inch, and wherein the step of extruding includes the step of
    extruding the extrusion rod to a filler-metal diameter of from about 0.05 to about 0.06 inch.

5. The method of claim 1, wherein the step of extruding includes the step of
    extruding the extrusion rod to a filler-metal diameter of from about 0.05 to about 0.06 inch.

6. The method of claim 1, wherein the step of extruding includes the step of
    extruding the extrusion rod with an areal extrusion ratio of from about 9:1 to about 25:1.

7. A method of manufacturing a welding filler metal, comprising the steps of casting a nickel-base alloy as an extrusion rod having a diameter of from about 0.2 inch to about 0.5 inch, the extrusion rod having at least about 12 grains in the cross section of the extrusion rod, wherein the step of casting the nickel-base alloy includes the step of casting the nickel-base alloy with a superheat of no more than about 50° F.; and extruding the extrusion rod in a single extrusion operation to a filler-metal diameter of less than about 0.1 inch and using an areal extrusion ratio of at least about 9:1 to form the welding filler metal.

8. A method of manufacturing a welding filler metal, comprising the steps of casting a nickel-base alloy as an extrusion rod having a diameter of from about 0.2 inch to about 0.5 inch, the extrusion rod having at least about 12 grains in the cross section of the extrusion rod, wherein the step of casting the nickel-base alloy includes the step of investment casting the nickel-base alloy into a mold having a grain refiner adherent to an inner surface of a wall of the mold; and extruding the extrusion rod in a single extrusion operation to a filler-metal diameter of less than about 0.1 inch and using an areal extrusion ratio of at least about 9:1 to form the welding filler metal.

9. A method of manufacturing a welding filler metal, comprising the steps of casting a nickel-base alloy as an extrusion rod of about ¼ inch diameter, the extrusion rod having at least about 12 grains in the ¼ inch diameter cross section of the extrusion rod; and extruding the extrusion rod in a single extrusion operation to a filler-metal diameter of from about 0.05 to about 0.06 inch.

10. The method of claim 9, wherein the step of casting the nickel-base alloy includes the step of casting a nickel-base superalloy.

11. The method of claim 9, wherein the step of casting includes the step of casting a nickel-base alloy having a composition selected from the group consisting of Rene' 195, which has a nominal composition in weight percent of about 7.4–7.8 percent chromium, about 5.3–5.6 percent tantalum, about 2.9–3.3 percent cobalt, about 7.6–8.0 percent aluminum, about 0.12–0.18 percent hafnium, about 0.5–0.6 percent silicon, about 3.7–4.0 percent tungsten, about 1.5–1.8 percent rhenium, about 0.01–0.03 percent carbon, about 0.01–0.02 percent boron, remainder nickel and incidental impurities; Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities; Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; and PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities.

12. A method of manufacturing a welding filler metal, comprising the steps of casting a nickel-base alloy as an extrusion rod of about ¼ inch diameter, the extrusion rod having at least about 12 grains in the ¼ inch diameter cross section of the extrusion rod, wherein the step of casting the nickel-base alloy includes the step of casting the nickel-base alloy with a superheat of no more than about 50° F.; and extruding the extrusion rod in a single extrusion operation to a filler-metal diameter of from about 0.05 to about 0.06 inch.

13. A method of manufacturing a welding filler metal, comprising the steps of casting a nickel-base alloy as an extrusion rod of about ¼ inch diameter, the extrusion rod having at least about 12 grains in the ¼ inch diameter cross section of the extrusion rod wherein the step of casting the nickel-base alloy includes the step of investment casting the nickel-base alloy into a mold having a grain refiner adherent to an inner surface of a wall of the mold; and extruding the extrusion red in a single extrusion operation to a filler-metal diameter of from about 0.05 to about 0.06 inch.

\* \* \* \* \*

UNITED STATES PATENT AND TRADEMARK OFFICE
CERTIFICATE OF CORRECTION

PATENT NO.   : 6,901,648 B2
DATED        : June 7, 2005
INVENTOR(S)  : Kelly et al.

It is certified that error appears in the above-identified patent and that said Letters Patent is hereby corrected as shown below:

Column 8,
Line 53, "red" should be -- rod --.

Signed and Sealed this

Thirty-first Day of January, 2006

JON W. DUDAS
*Director of the United States Patent and Trademark Office*